United States Patent [19]
Saito et al.
[11] 4,289,733
[45] Sep. 15, 1981

[54] APPARATUS FOR MAKING SILVER HALIDE GRAINS

[75] Inventors: Hirokazu Saito; Keiichi Suzuki; Masayuki Shimizu; Junji Miyahara, all of Minami-ashigara, Japan

[73] Assignee: Fuji Photo Film Co., Ltd., Minami-ashigara, Japan

[21] Appl. No.: 19,062

[22] Filed: Mar. 9, 1979

Related U.S. Application Data

[62] Division of Ser. No. 641,714, Dec. 17, 1975.

[30] Foreign Application Priority Data

Dec. 17, 1974 [JP] Japan ................................ 49-145381

[51] Int. Cl.[3] ............................ B01F 5/04; B01F 7/00
[52] U.S. Cl. .................................... 422/227; 422/225; 366/173; 366/294
[58] Field of Search ............... 422/225, 231, 227, 228; 366/264, 266, 265, 167, 168, 173 X, 294; 96/94 R; 251/61.1

[56] References Cited

U.S. PATENT DOCUMENTS

| | | | |
|---|---|---|---|
| 1,935,190 | 11/1933 | Munro | 422/227 |
| 2,209,287 | 7/1940 | Simpson | 366/294 |
| 2,385,128 | 9/1945 | Castner | 422/225 |
| 2,435,898 | 2/1948 | Otto | 422/225 |
| 2,968,544 | 1/1961 | Zeitz et al. | 422/225 |
| 2,990,252 | 6/1961 | Geldern et al. | 251/61.1 |
| 3,083,943 | 4/1963 | Stewart et al. | 251/61.1 |
| 3,782,697 | 1/1974 | Karg | 366/167 |
| 3,785,777 | 1/1974 | Porter et al. | 422/225 |

*Primary Examiner*—William F. Smith
*Assistant Examiner*—Chris Konkol
*Attorney, Agent, or Firm*—Sughrue, Mion, Zinn, Macpeak and Seas

[57] ABSTRACT

An apparatus for producing silver halide grains of a uniform size wherein the apparatus comprises a mixing chamber comprising a casing of a polygonal-pillar shape within a reaction vessel filled with an aqueous colloid solution in such a manner that the interior of the mixing-chamber is filled with the aqueous colloid solution, where a water soluble silver salt solution and a water soluble halide solution are supplied by way of conduits to the lower end of the mixing chamber to dilute the solution with the aqueous colloidal solution contained in the mixing chamber, first agitation means disposed in the mixing chamber for rapidly agitating to mix and react both reaction liquids to form silver halide grains, and a second agitation means for immediately discharging the silver halide grains into the reaction vessel to ripen the silver halide grains outside of the mixing chamber.

3 Claims, 9 Drawing Figures

4
4
13
12
1
3
11
10

FIG.1
PRIOR ART
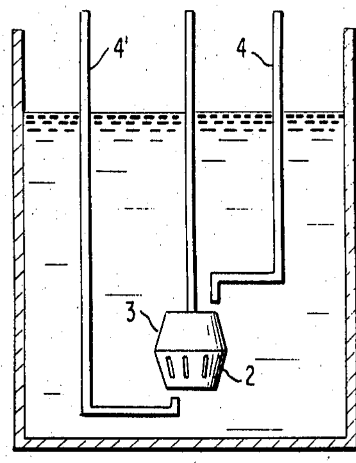
PRIOR ART
FIG.2
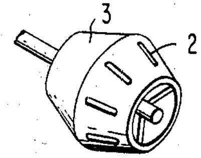
FIG.3
PRIOR ART
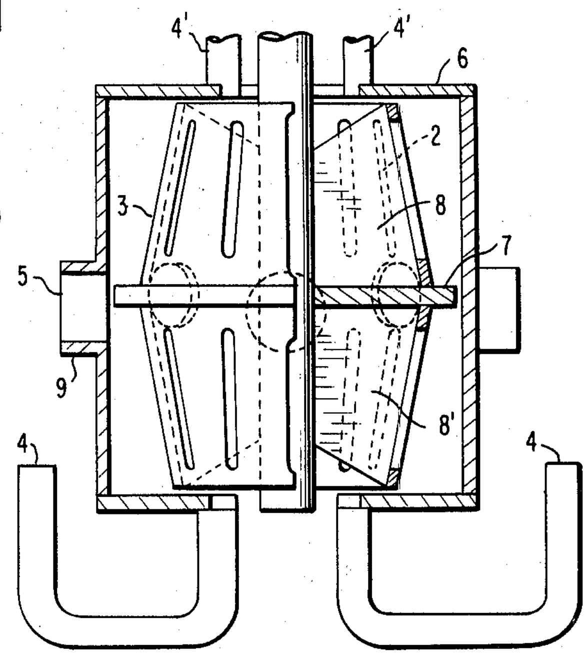
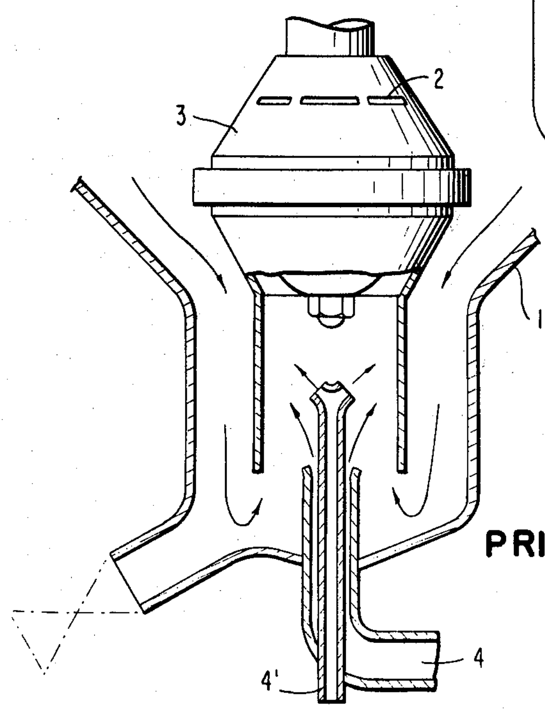
FIG.4
PRIOR ART

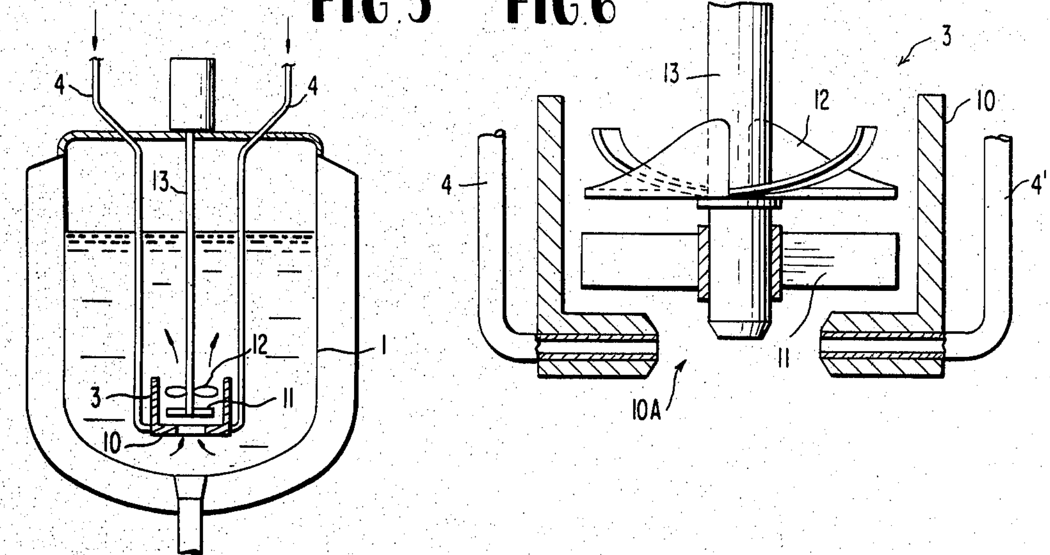
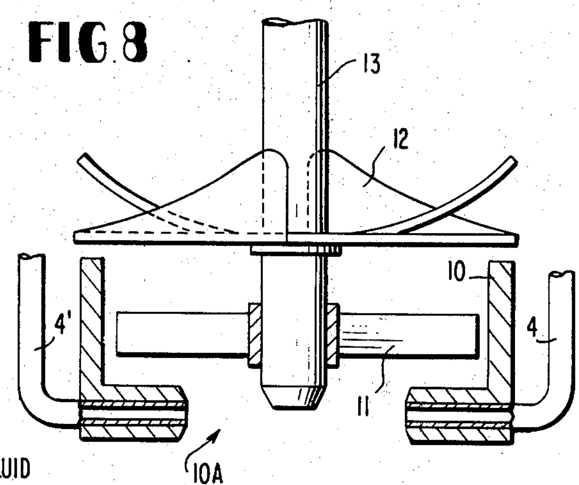
FIG.7
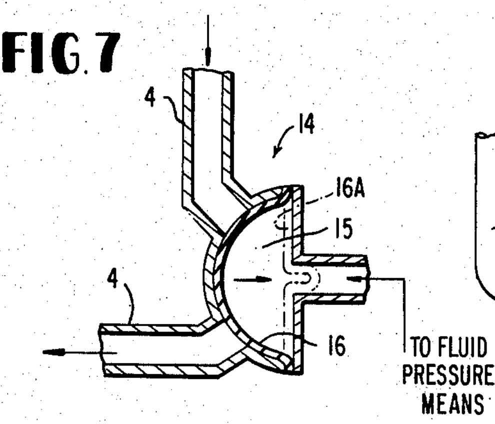
FIG.9
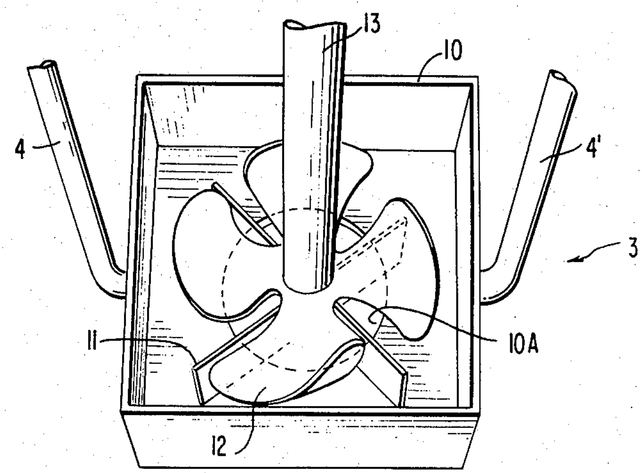

APPARATUS FOR MAKING SILVER HALIDE GRAINS

This is a division of application Ser. No. 641,714, filed Dec. 17, 1975.

BACKGROUND OF THE INVENTION

1. Field of the Invention

This invention relates to a process of producing silver halide grains and to apparatus therefor. More particularly, this invention relates to a process of producing silver halide grains which exhibit a narrow grain size distribution and to apparatus therefor.

2. Description of the Prior Art

Silver halide grains are ordinarily formed by the double decomposition reaction of a water soluble silver salt solution and a water soluble halide solution. Processes of making silver halide grains which exhibit narrow grain size distribution are disclosed in U.S. Pat. Nos. 3,415,650, 3,692,283 and British Patent No. 1,323,464.

In the method disclosed in U.S. Pat. No. 3,415,650, as illustrated in FIGS. 1–2, there is provided an arrangement wherein a rotating hollow mixing device 3 (whose interior is filled with an aqueous colloid solution) having openings such as slits (hereinafter referred to as "slits") 2 in the middle part of an expanded cylindrical wall as shown in FIG. 2 is disposed in a reaction vessel 1 and provided with a rotating vertical shaft. The reaction vessel 1 contains the aqueous colloid solution as shown in FIG. 1. A water soluble silver salt solution and a water soluble halide solution are introduced from open ends at upper and lower portions of the mixing device through conduits 4, 4' into the mixing device 3 while the mixing device is rotated at high speed to cause the same to undergo rapid mixing and reaction and to form small silver halide grains. The thus formed small silver halide grains are then expelled through slits 2 in the wall of the mixing device 3 into the aqueous colloid solution (hereinafter referred to as the "bulk liquid") outside of the mixing device 3 due to the centrifugal force produced by the rotation of the mixing device 3 and the grains are ripened. Although not specifically described, it is presumed that when the silver halide grains expelled into the bulk liquid are again circulated within the mixing device 3, the growth of the silver halide grains occurs or continues. Hence, circulation of the bulk liquid (as well as the silver halide grains suspended in the bulk liquid) occurs and is maintained by the suction force in the upper and lower open ends of the rotating mixing device 3, the suction force being produced by the discharge of the silver halide grains from the mixing device.

However, the above method has several disadvantages. First, very large grains tend to be formed since high concentration reaction liquids are reacted with one another; second, since the degree of mixing within the mixing device and the circulation of the bulk liquid are both dependant on the rotation of the mixing device, the parameters thereof cannot be varied independently; third, the rotating mixing device is of complicated construction, resulting in difficulty of washing the apparatus; and, fourth, the downward flow toward the mixing device 3 tends to drag air therein to produce bubbles, resulting in uneven reaction and the necessity of removal of the bubbles thereafter in the process.

The method disclosed in British patent specification No. 1,323,464 relates to an improvement in the method disclosed in U.S. Pat. No. 3,415,650. As shown in FIG. 3, a mixing device 3 is housed in a casing 6 which is securely fixed thereto, mixing device 3 having outlet ports 5 in its wall and being divided by a disc 7 into upper and lower chambers 8 and 8'. Mixing device 3 and the casing 6 are filled with an aqueous colloid solution as earlier described. A water soluble silver salt and a water soluble halide are fed into chambers 8, 8', through conduits 4, 4', respectively, of the mixing device 3 and are immediately diluted by the aqueous colloid solution in chambers 8, 8' and discharged from outlet slits 2 of the mixing device into the casing 6 by rotation of the mixing device 3 and thence into the bulk liquid outside the casing 6 from the outlet ports 5 in outlet tubes 9 of the casing 6. In this manner, small silver halide grains formed by mixture of reaction liquids discharged into the bulk liquid are again carried into the mixing device 3 and further grown by circulation of the bulk liquid resulting from rotation of the rotating mixing device 3. This circulation of bulk liquid occurs and is maintained by the suction force in the upper and lower ends of the rotating mixing device 3 in a manner similar to that described in U.S. Pat. No. 3,415,650.

The method of this British Patent has the feature that since reacting liquids are individually diluted and thereafter reacted, very large silver halide grains form only with difficulty, even if the concentration of the reacting liquid supplied is raised, whereby the first disadvantage encountered in the method disclosed in the U.S. Pat. No. 3,415,650 can be eliminated. However, the fact that the degree of mixing and the circulation amount of the bulk liquid are both determined only by rotation of the mixing device still remains as a fault, and hence, the above second disadvantage is not eliminated. Moreover, in this method, the mixing device is divided into upper and lower chambers so that the reacting liquids can individually be diluted, and a casing is provided therearound, resulting in an extremely complicated construction, and, as a result, in the event a system needs to be washed when a material is changed-over after operation has been completed, washing is extremely difficult. Thus, the above-mentioned third disadvantage still remains unsolved. Furthermore, the downward flow toward the mixing device 3 is still present and, therefore, the above-mentioned fourth disadvantage still remain unimproved.

Further, in the method disclosed in U.S. Pat. No. 3,692,283, there is provided a centrally expanded cylindrical hollow rotating mixing device 3 formed with slits 2 in the upper wall thereof located adjacent the bottom surface of a reaction vessel 1 containing an aqueous colloid solution therein, as shown in FIG. 4, to effect reaction to form silver halide grains. According to this arrangement, the silver salt solution and halide solution are supplied from the lower portion of the rotating mixing device 3 to the lower zone of the mixing device 3, passing through conduits 4, 4', while the rotating mixing device 3 is rotated to discharge silver halide grains formed therein along with aqueous colloid solution outward through the slits 2 so that both reaction liquids are sucked into the rotating mixing device 3 to receive vigorous mixing caused by rotation of the mixing device 3 and are quickly reacted to form silver halide grains. The resulting silver halide grains are expelled outward from the mixing device 3 through the slits formed in the upper wall of the mixing device 3 and join with the circulating flow of bulk liquid which results from the rotation of the mixing device 3 and are subsequently recycled into the mixing device 3 for further growth as silver halide grains. The above-mentioned method improves the fourth disadvantage among the four disadvantages noted for U.S. Pat. No. 3,415,650, but the other three disadvantages still remain unsolved.

SUMMARY OF THE INVENTION

The present invention overcomes the disadvantages noted above with respect to the prior art and it is therefore an object of the invention to provide a process of producing silver halide grains of uniform grain size and apparatus therefor.

One effective means for producing silver halide grains of uniform grain size as described above is to increase the amount of the circulating flow of the bulk liquid containing suspended silver halide grains into a mixing device wherein halide grains are formed. This is disclosed in Japanese Patent Application No. 141720/74, filed Dec. 9, 1974.

The present inventors have achieved the object of the present invention by disposing a mixing chamber composed of a polygonal pillar like casing within a reaction vessel filled with an aqueous colloid solution in a manner such that the mixing chamber's interior is filled with the aqueous colloid solution, individually supplying a water soluble silver salt solution and a water soluble halide solution to the lower end of said mixing chamber to dilute the solutions by the aqueous colloid solution contained in the mixing chamber, rapidly agitating, mixing and reacting both reaction liquids by a first agitator means disposed in the mixing chamber to form silver halide grains, and immediately discharging the silver halide grains into the exterior of the reaction vessel (exterior of the mixing chamber) by a second agitator means and ripening the silver halide grains therein.

Other objects and features of the present invention will be pointed out in the following detailed description and illustrated in the accompanying drawings, which disclose, by way of example, the principal of the invention and the best modes contemplated for carrying out the invention.

BRIEF DESCRIPTION OF THE DRAWINGS

FIGS. 1 through 4 are schematic illustrations showing prior art methods of making silver halide grains.

FIG. 5 schematically illustrates apparatus for making silver halide grains showing one preferred embodiment of the present invention.

FIG. 6 is a schematic longitudinal cross-sectional view showing one embodiment of a mixing device used in apparatus for making silver halide grains according to the present invention. It should be noted in this regard that upper agitator blade 12 in FIG. 6 is substantially identical to the upper agitator blade 12 in FIG. 8.

FIG. 7 shows one embodiment of a valve used in the bulk liquid used in the apparatus for making silver halide grains according to the present invention.

FIG. 8 is a schematic longitudinal cross-sectional view showing another embodiment of apparatus useful in the present invention.

FIG. 9 is a schematic longitudinal cross-sectional view showing the apparatus used in the Example.

DESCRIPTION OF THE PREFERRED EMBODIMENTS

Referring now to FIG. 5, which schematically illustrates apparatus for making silver halide grains in one preferred embodiment of the present invention, a water soluble silver salt solution and a water soluble halide solution are continuously introduced from a remote source by conduits 4, 4', respectively, into a mixing device 3 disposed within reaction vessel 1. Reaction vessel 1 contains therein an aqueous colloid solution, and a mixing device 3 is positioned beneath the surface of the aqueous colloid solution and filled with the aqueous colloid solution. Bulk liquid within the reaction vessel 1 is always circulated so as to flow from the bottom to the top of the mixing device 3 due to the functioning of one agitation means in the mixing device.

FIG. 6 is a schematic longitudinal cross-sectional view of a mixing device 3 used in one embodiment of the present invention. A silver salt aqueous solution and a halide aqueous solution are introduced from a remote source by conduits 4, 4', respectively, into a mixing device 3. The mixing device 3 is in the form of a casing 10, which comprises a right square pillar having a predetermined sectional area. The casing 10 has an upper end which is open while the lower end thereof is formed with a circular opening 10A through which the aqueous colloid solution in the mixing device 3 can mix with the bulk liquid. Reactant liquid conduits 4, 4' are arranged within the portion of casing 10 at the lower end of casing 10 and are open towards the circular opening 10A. Within the mixing device 3 there are disposed agitator blades 11 and 12, which are mounted on a single shaft 13 which is driven by a motor (not shown). Among agitator blades 11 and 12, when the upper agitator blade 12 is rotated the aqueous colloid solution is always circulated from opening 10A upward within the mixing device 3.

The water soluble silver salt solution and the water soluble halide solution introduced into the mixing device 3 join, with the flow of the aqueous colloid solution being drawn upward via opening 10A by the mixing device 3, while being diluted by aqueous colloid solution being circulated in the mixing device 3, and are vigorously agitated by the rotation of the lower agitator blade 11, whereby both reactant solutions are rapidly mixed and reacted to form silver halide grains of small size while bulk liquid is flowing from the bottom to the top of the mixing device 3. The resulting silver halide grains are immediately expelled from the reaction zone out of the mixing device 3 by the action of the upper agitator blade 12. The silver halide grains are permitted to remain in the mixing chamber (residence time) for a time less than about 1 second, preferably less than 0.8 second.

Since the bulk liquid within the reaction vessel 1 is circulated by the action of the agitator blade 12 as previously explained, the silver halide grains expelled out of the mixing device 3 are circulated by the stream of circulating bulk liquid and are eventually recycled in the mixing device 3.

The lower agitator blade 11 disposed at the lower part of the mixing chamber 3 must be of the type which can create a desired degree of mixing in the mixing space. Generally, the degree of mixing is determined by the conditions of turbulent flow within the mixing space as shown in FIG. 6 and can be quantitatively determined by the representative time length $t=\eta/u'$ on a micro-scale as can be calculated from the turbulent flow velocity u' and the representative length $\eta$ of the eddy on a micro-scale. This degree of mixing is an extremely important operational factor in that it is concerned with the conditions of nucleus formation, i.e., on the one hand to determine the amount of stabilized nuclei forming in combination with the concentration of the reactants and the feeding speed, and, on the other hand, to determine the pAg in the vicinity of the mixing chamber which affects the crystal habit of the growing silver halide grains.

The upper agitator blade 12 disposed at the upper part of the mixing device 3 must be of the type which is capable of rapidly withdrawing the formed silver halide grains from the reaction zone and rapidly discharging them from the mixing device 3 in order to avoid the formation of large grains from aggregates of small silver halide grains resulting from silver halide grains formed within the mixing space remaining within the mixing device 3 for too long a period, and to avoid the formation of large grains which result from further reaction with reactants fed into the mixing device 3.

Any type of lower agitator blade 11 can be used as long as it can form a primary stream in the peripheral direction and radial direction, for example, a turbine type, fan turbine type, etc., blade. In particular, disc-like agitator blades having a number of holes in the disc portion thereof are conveniently employed since they can sufficiently maintain agitation effects even if the disc thickness is small so that the casing 10 can be designed very small. Such a disc-like agitator blade is, simply, a disc with perforations therethrough. The perforations can all be of the same size or of varying sizes, depending upon the desired effect.

Any type of upper agitator blade 12 can be used as long as it can form a stream in the upward axial direction, for example, a propeller type, inclined blade turbine type, inclined blade fan turbine type, etc., blade.

The above types of mixing blades are well known to the art, and can easily be selected, for example, following the teaching of *Theory of Mixing* of Oldeshue and Sprague, Paint and Varnish Production, May 19, 1974, pages 19–28, *Turbine Agitator Selection,* by Hicks and Gates, Paint and Varnish Production, May 1974, pages 43–47 and *Liquid Mixing with Radial Turbine Mixer,* by Satsangi, Chemical Engineering World, Vol. VIII No. 6, June 1973, pages 103–109.

In most preferred modes of commercial operation, the distance between the lower and upper agitator blades is greater than the width of the agitator blades. However, this is not a critical limitation on the present invention since lesser distances can be used by an appropriate selection of upper and lower agitator blades.

The casing 10 is a square pillar, as previously mentioned. For this reason, the flow formed by the lower agitator blade 11 is stirred at corner portions of the casing 10 to further enhance mixing effects without the provision of additional members such as baffles, etc.

According to the illustrated embodiment, the agitating and mixing of reactant solutions and the circulation of aqueous colloid solution are accomplished by different agitator blades, respectively, so that the kinds of agitator blades used may be freely selected, whereby the degree of mixing and the circulating amount can be independently set to their desired values for operation. The most suitable conditions may readily be obtained by replacing these agitator blades, when necessary, with those of a suitable kind and having the desired mixing/flow capability. In this manner, the agitating and mixing of reactant solutions and the circulating amount of bulk liquid can be independently varied in the present embodiment so that silver halide grains having a desired grain size distribution can be produced. In addition, to provide the optimum reaction conditions in the present process, it is very easy to vary agitating conditions by changing the capacity of the reaction vessel 1, the amount of silver halide grains produced, and by changing the method of making the silver halide grains per se such as the single jet process, double jet process, controlled double jet process and the like.

In order to further enhance the effects above, it is desirable that the agitator blade 11 and agitator blade 12 have their own axes of revolution. With this arrangement, the number of revolutions of agitator blade 12 and of agitator blade 11 can be made independent from each other, and hence the degree of mixing in the mixing device 3 and the circulating flow rate can be independently selected to thereby enhance the flexibility of the reaction.

In the present embodiment, flow within the mixing device 3 is upward, and, therefore, even when the amount of bulk liquid is decreased, air is not drawn into the bulk liquid to produce bubbles so that reaction can be uniformly accomplished and, in addition, no procedure such as bubble removal is required in, e.g., desalting.

Another advantage of this invention is that no fixed members such as baffles within the mixing device 3 are needed and agitator blades 11 and 12 can easily be removed by removing shaft 13, and, therefore, the apparatus can be washed in a simple manner. Washing of the apparatus is usually performed not only when the products are changed over but also upon termination of one operation; accordingly, such an improvement in ease of washing results in a considerable decrease in the manufacturing cost of the silver halide grains.

While the described embodiment represents the preferred form of the present invention, it is to be understood that modifications can occur therein without departing from the spirit of the invention. For example, the conduits 4, 4' open into a plane parallel to the plane determined by the circular hole at the lower end of the casing 10 in the above-described embodiment, but conduits 4, 4' can also open upwardly. In fact, the provision of upwardly directed openings will often be preferred because crystals do not stick to the opened portion as shown in, e.g., FIG. 6. While not especially limitative, usually desirable effects are obtained when the total area of the lower end of the casing is from about 1/5 to about ⅔ the total area of the diameter of the lower end of the casing. Also, the casing 10 used in the above-described embodiment was a square pillar. However, all that need be done is to arrange so that the flow formed by the agitator blade 11 is agitated by internal corner portions of the square pillar. For this reason, the casing need not necessarily be a square pillar, but a triangular pillar, a pentagonal pillar, a hexagonal pillar or other polygonal pillars can also be employed. However, the greater the number of corners, the closer the contour comes to cylindrical, whereby the effect of further agitation of the flow is reduced. For example, the maximum number of corners that will generally be used on a commercial scale is 12, since above 12 the effects of using a polygonal structure tend to be lessened. Further, it is most preferred that the polygons be regular. While in theory an irregular polygon could be utilized, it will be apparent to one skilled in the art that such makes construction of the apparatus extremely difficult and could lead to pockets of irregular mixing wherein grain size distribution could be adversely effected, i.e., process reproducibility might be less. Therefore, it is necessary to select a polygonal pillar having a suitable number of corners so that the desired agitating and mixing effect may be obtained. It is most preferred to utilize a square or rectangular pillar, most preferably a square pillar.

While not limitative, generally the height/width ratio of the polygonal pillar-like casing used for the mixing chamber in accordance with the present invention is from about 0.3 to about 2, preferably 0.4 to 1.2 and most preferably 0.5 to 0.7. As will be clear, it is not necessary that the height of the mixing chamber always be greater than the width of the mixing chamber, but such is the case for most preferred operation.

Further, reactant introducing conduits 4, 4' are preferably provided with an interior valve 14 in the bulk liquid as shown in FIG. 7, taking conduit 4 as illustrative. That is, each of conduits 4, 4' is cut into two portions immediately before the opening in the mixing device 3 so as to form a small chamber 15 therebetween. In this small chamber 15 there is provided a flexible film 16, such as rubber as shown in FIG. 7, facing both cut portions. The rear side of flexible film 16 is connected to a fluid pressure means such as a compressor or pump (not shown) so that the flexible film 16 can be moved by the application of pressure thereto, under normal pressure or by a reduction of pressure so as to connect or disconnect both cut portions. Thus, when the reactant solution is introduced, the fluid pressure means is not actuated to allow both cut portions to be connected, whereas when the reactant solution ceases to be introduced, the fluid pressure means is actuated to allow both cut portions to be disconnected. Numeral 16 identifies the flexible film disconnecting both cut portions, whereas the dotted lines identified by numeral 16A in FIG. 7 show the flexible film permitting both sections of conduit 4 to be connected.

By the provision of such valve 14, when reaction is not taking place the aqueous colloid solution (within which the formed silver halide grains are suspended) within the reaction vessel 1 never enters the conduits 4, 4' by diffusion thereof, and hence, the growth of silver halide grains never occurs due to progress of the reaction within conduits 4, 4' when reaction is not taking place, resulting in a smooth restart of the reaction.

As will be clear from the foregoing description, the valve 14 in liquid is preferably positioned as close as possible adjacent the opening of reactant solution conduits 4, 4' in the mixing device 3.

The construction of the valve 14 is not limited to an arrangement as disclosed above, but may also be such that conduits 4, 4' are formed with a flexible film extending over a certain length thereof close to the opening of the conduits 4, 4', with the outer portion of conduits 4, 4' being connected to a suitable pressure means which is not actuated when reactant solution is not fed but which is actuated when reactant solution ceases to be fed to disconnect the conduits 4, 4'.

Further, reactant solution conduits 4, 4' may be mounted on a support rod which supports the mixing device 3 within the reaction vessel 1 so as to simplify the construction within the reaction vessel 1.

It is desirable that an auxiliary agitator means be provided within the reaction vessel 1 to allow silver halide grains suspended in the bulk liquid to recycle into the mixing device 3 in a uniform manner. Since such an auxiliary agitator means is primarily provided to render more uniform the flow of the bulk liquid within the reaction vessel 1, the type of agitator selected is not particularly limited, and its location can be selected as desired to provide the agitation effects which are sought. This purpose may also be achieved without a separately provided auxiliary agitator means, by the provision of agitator blade 12 disposed, as shown in FIG. 8, outside the casing to provide a high upward thrust or suction effect (if the blade is disposed within the casing, the ability of the agitator blade is restricted by the effective diameter of the casing) so as to increase the agitation of bulk liquid. It will be seen that this is a modification of disposing the agitation blade 12 in the upper part of the mixing device as in the embodiment of FIG. 6.

The water soluble silver salt which can be employed in practicing this invention is silver nitrate. The silver nitrate can be used as an aqueous solution per se or as an aqueous solution of silver nitrate having aqueous ammonia added thereto. Such silver nitrate-aqueous ammonia solutions are well known in the art.

The water soluble halides which can be employed in practicing this invention include, for example, sodium chloride, sodium bromide, sodium iodide, potassium chloride, potassium bromide, potassium iodide, ammonium chloride, ammonium bromide, calcium chloride, mixtures of such halides, and other water soluble halides used to form conventional silver halides.

Further, the colloidal material(s) which can be employed in practicing this invention includes, for example, gelatin, colloidal albumin, casein, cellulose derivatives such as carboxymethylcellulose and hydroxyethylcellulose, agar-agar, sodium alginate, saccharide derivatives such as starch derivatives, synthetic hydrophilic colloids such as polyvinyl alcohol, poly-N-vinylpyrrolidone, polyacrylic acid copolymers, polyacrylamide or derivatives thereof, and soluble mixtures of such colloids, which may be selected as desired. Among these colloids, gelatin is preferred. A part or all of the gelatin may be replaced by a synthetic high molecular weight polymer substance, and the gelatin may be replaced by a gelatin derivative, that is, one obtained by replacing a functional group in the molecule of gelatin, such as an amino group, imino group, hydroxy group or carboxyl group, with a reagent having a group which can be reacted therewith, or a graft polymer obtained by grafting a molecular chain of another high molecular weight polymer onto the gelatin backbone.

The reagents used to produce the above-mentioned derivatives include, for example, isocyanates, acid chlorides, and acid anhydrides as described in U.S. Pat. No. 2,614,928, acid anhydrides as described in U.S. Pat. No. 3,118,766, bromoacetic acid as described in Japanese Patent Publication No. 5514/1964, phenylglycidylether as described in Japanese Patent Publication No. 26845/67, vinylsulfone compounds as described in U.S. Pat. No. 3,132,945, N-allylvinylsulfone amide as described in British Pat. No. 861,414, maleinimide compounds as described in U.S. Pat. No. 3,186,846, acrylonitriles as described in U.S. Pat. No. 2,594,293, polyalkylene oxide as described in U.S. Pat. No. 3,312,553, epoxy compounds as described in Japanese Patent Publication No. 26845/67, acid esters as described in U.S. Pat. No. 2,763,639, and alkane sultones as described in British Pat. No. 1,033,189.

Many branched high molecular weight polymers which can be grafted onto gelatin are found in the descriptions, for example, in U.S. Pat. Nos. 2,763,625, 2,831,767, and 2,956,884 or in the articles in *Polymer Letters,* 5, 595 (1967), *Phot. Sci. Eng.,* 9, 148 (1965), and *J. Polymer Sci.,* A-1 9, 3199 (1971).

Polymers or copolymers which comprise acrylic acid, methacrylic acid or derivatives thereof such as esters, amides or nitriles; or vinyl monomers such as ethylene, propylene and the like, can also be used for grafting onto gelatin. However, hydrophilic vinyl polymers or copolymers thereof which are soluble in gelatin to some extent, for example, polymers of acrylic acid, acrylamide, methacrylamide, hydroxyalkylacrylates and hydroxyalkylmethacrylates are preferred.

As previously mentioned, the present invention can be applied to various process of producing silver halide grains such as the single jet process, double jet process, controlled double jet process and the like, and in particular, where the invention is applied to the controlled double jet process, the reaction in the mixing chamber can be quickly and completely accomplished. From this, if the amount of silver salt aqueous solution is maintained approximately equal to that of the halide aqueous solution, the concentration of silver ion in the dispersion liquid (aqueous colloid solution containing suspended silver halide grains) can be relatively easily maintained at a predetermined value to provide a significant advantage in making silver halide grains. That is, the present invention has various advantages, for example, in making silver halide grains, silver halide grains of a narrow grain size distribution can be obtained, various characteristics of the silver halide grains obtained do not vary much, even with variations in the amount of silver halide produced, and silver halide grains of excellent characteristics can be obtained in a reproducible manner, as opposed to the prior art where product variation from run to run was common.

From the heretofore offered disclosure, it will be apparent to one skilled in the art that the present invention is of high flexibility and adaptability, and can be utilized to produce silver halide grains of varying grain size distributions, depending upon the end use of the photographic material formed therefrom. The present invention is thus not limited to any particular process conditions or any particular type of apparatus so long as the spirit of the invention as heretofore described is followed.

However, as with any process invention, there are certain highly preferred conditions for commercial operation in a most economical fashion, which conditions are discussed in detail below.

For example, the halide solution is conveniently used at a concentration of from about 0.1 to about 4.5 N, more preferably 0.5 to 3 N, while using the silver salt solution at a concentration of from about 0.1 to about 4 N, more preferably 0.5 to 3 N.

Most commercially desirable silver halides can be obtained using a molar ratio of halide to silver salt of from about 0.8 to about 2.0, even more typically 0.95 to 1.1.

Operation is easily effected when the weight ratio of the reactants is such as will provide a weight ratio of silver halide to aqueous colloid solution (exclusive of reactants and product) of from about 1/10 to about 1/30, the aqueous colloid solution comprising from about 0.5 to about 25% by weight colloid, more conveniently 2 to 10% by weight colloid, based on the total weight of all components present.

The temperature of the reaction is not particularly limited, but reaction is conveniently effected at about 35° to about 85° C., more preferably 40° to 75° C.

Reaction is typically at atmospheric pressure, and little is to be gained in the way of improving product characteristics by operation at sub- or super-atmospheric pressure.

The reaction time varies widely and differs in accordance with the type of silver halide to be produced, typically the grain size and grain distribution desired setting the reaction time. Usually, if a broader grain size distribution is desired the circulation flow rate is lesser while, on the contrary, if a narrower grain size distribution is desired, the circulation flow rate is larger.

This invention will now be further illustrated by the following example to show the effects thereof.

EXAMPLE 80 g of gelatin dissolved in 4,000 cc of water was introduced into a cylindrical reaction vessel with a semispherical bottom having a diameter of 250 mm and a depth of 320 mm, and within this liquid there was disposed a mixing device as shown in FIG. 9 with the lower end thereof positioned 35 mm from the bottom of the reaction vessel. Then, a silver nitrate aqueous solution (500 g of silver nitrate dissolved in 2,000 cc of water; 50° C.) and a halide aqueous solution (140 g of potassium bromide, 8 g of potassium iodide and 119 g of sodium chloride dissolved in 2,000 cc of water; 60° C.) were added to the mixing device at constant flow rates (100 cc/min) to form a silver halide by precipitation by the double jet process for 20 minutes at an operating temperature of 60° C. The introduction of the halide aqueous solution was started 15 seconds earlier than the silver nitrate aqueous solution.

The mixing device used had a casing in the form of a right square pillar (square section) with the dimensions thereof being 70 mm×70 mm×45 mm (height), the lower agitator blades (4 blades) had a diameter of 60 mm and were of the turbine type with a height of 10 mm, and the upper agitator blades (4 blades) had a diameter of 60 mm and were of the inclined blade turbine type with a height of 10 mm and the angle of the inclined blades being 45° with respect to the vertical plane, the distance (vertical) between both centers of the agitator blades was 20 mm, and the center of the lower agitator blades was positioned 15 mm from the center of the opening in the reactant solution conduits.

The reaction described was carried out with three different residence times, 0.5 second, 0.3 second and 0.15 second, by replacing the upper agitator blade so as to vary the circulating amount while maintaining the shaft 800 r.p.m's constant. The residence time was calculated by measuring the flow velocity using a hot-wire current meter made by DISA Co., Denmark.

The process was conducted at atmospheric pressure.

The silver halide grains thus obtained were observed using an electron microscope. The average grain size and standard deviation are given in Table 1 below.

TABLE 1

| Residence Time | Average Grain Size ($\mu$) | Standard Deviation ($\mu$) |
|---|---|---|
| 0.5 sec | 0.98 | ±0.20 |
| 0.3 sec | 0.95 | ±0.18 |

TABLE 1-continued

| Residence Time | Average Grain Size (μ) | Standard Deviation (μ) |
|---|---|---|
| 0.15 sec | 0.93 | ±0.13 |

It was found from Table 1 that the shorter the residence time in the mixing device, that is, the greater the circulating flow rate, the narrower the grain size distribution of the silver halide grains formed. It is obvious that the effects noted above were obtained by the process of the present invention in which the degree of agitating and mixing was set constant and the circulating flow rate varied independently thereof.

As is clear from the foregoing description, the present invention exhibits novel effects as follows:

(1) Since mixing for reaction and the circulating of bulk liquid caused by discharge of formed silver halide grains are each carried out using a separate agitator means, the desired degree of mixing and the circulating amount can be set separately by selecting an agitator blade having a suitable ability for mixing or circulating, and as a result silver halide grains having a narrower grain size distribution are obtained.

(2) For the same reason as described in paragraph (1), each agitator blade can be mounted on a separate shaft to individually select the r.p.m.'s for agitation, and, hence, the desired degree of mixing and the circulating amount can be individually set to a value as desired and silver halide grains of a narrower grain size distribution can be produced.

(3) A polygonal pillar is used as the casing of the mixing device, whereby the agitating and mixing effects are enhanced by the employment of apparatus of simple construction without baffles or the like within the mixing device.

(4) Although the apparatus is simple in construction, the reactant solutions are reacted after being diluted by a bulk liquid, and, therefore, extremely large grains are not produced.

(5) Since the flow of bulk liquid passing through the mixing device is upward, air is never drawn into the aqueous colloid solution, and, as a result, uniform reaction is accomplished, and, in addition, no inconveniences in later processing steps, such as desalting, are encountered.

(6) Since the effects noted in the foregoing paragraphs (1) to (5) are obtained by an extremely simple apparatus, cleaning of the apparatus as may be necessary when the product is changed-over can be done very easily.

While the invention has been described in detail and with reference to specific embodiments thereof, it will be apparent to one skilled in the art that various changes and modifications can be made therein without departing from the spirit and scope thereof.

What is claimed is:

1. Apparatus for producing silver halide grains by a process which comprises introducing a water soluble silver salt solution and a water soluble halide solution for purposes of reaction to form silver halide grains into a vertically disposed mixing chamber whose interior is filled with an aqueous colloid solution, which mixing chamber is within a reaction vessel which is also filled with said aqueous colloid solution, comprising:

the mixing chamber comprising a polygonal-pillar casing, the upper and lower ends of which are open, and which is provided with (i) first agitator means in the lower portion thereof to achieve a first agitation which quickly mixes and reacts both reactant liquids; and (ii) second agitator means in the upper interior portion thereof to achieve a second agitation which quickly expels the silver halide grains formed upwardly into the aqueous colloid solution in the reaction vessel outside said mixing chamber; and (iii) means for controlling the rate of revolution of said first agitator means and said second agitator means independently of each other.

2. The apparatus of claim 1, wherein said solutions are independently fed by way of separate conduits into said mixing chamber characterized in that a valve is provided in the aqueous colloid solution directly before the openings of said conduits into the mixing chamber, the valve capable of being opened and closed by expanding and contracting a flexible film therein through variations in fluid pressure.

3. The apparatus of claim 1, wherein said polygonal-pillar casing is a right square-pillar casing.

* * * * *